United States Patent

Wistuba et al.

[11] Patent Number: 5,946,366
[45] Date of Patent: Aug. 31, 1999

[54] NUCLEAR REACTOR WITH A COLLECTION CHAMBER FOR CORE MELT

[75] Inventors: Lothar Wistuba, Herzogenaurach; Josef Hollmann, Schlüsselfeld, both of Germany

[73] Assignee: Siemens Aktiengesellschaft, Munich, Germany

[21] Appl. No.: 08/999,548

[22] Filed: Dec. 29, 1997

Related U.S. Application Data

[63] Continuation of application No. PCT/DE96/01059, Jun. 14, 1996.

[30] Foreign Application Priority Data

Jun. 28, 1995 [DE] Germany ............... 195 23 548

[51] Int. Cl.⁶ ............................................. G21C 9/016
[52] U.S. Cl. ............................................. 376/280
[58] Field of Search ............................................. 376/280

[56] References Cited

U.S. PATENT DOCUMENTS

| | | | |
|---|---|---|---|
| 3,702,802 | 11/1972 | Jansen, Jr. ............... | 376/280 |
| 3,979,866 | 9/1976 | Prescott ............... | 376/289 |
| 4,036,688 | 7/1977 | Golden et al. ............... | 376/280 |
| 4,289,582 | 9/1981 | Parr et al. ............... | 376/293 |
| 5,307,390 | 4/1994 | Gou et al. ............... | 376/280 |
| 5,347,556 | 9/1994 | McDonald et al. ............... | 376/280 |
| 5,659,589 | 8/1997 | Wistuba et al. ............... | 376/280 |

FOREIGN PATENT DOCUMENTS

| | | | |
|---|---|---|---|
| 4319094A1 | 12/1994 | Germany ............... | 376/280 |
| 4339904A1 | 12/1994 | Germany ............... | 376/280 |
| 1302319 | 1/1973 | United Kingdom . | |
| 1511620 | 5/1978 | United Kingdom . | |
| 2236210 | 3/1991 | United Kingdom ............... | 376/280 |

Primary Examiner—Daniel D. Wasil
Assistant Examiner—M. J. Lattig
Attorney, Agent, or Firm—Herbert L. Lerner; Laurence A. Greenberg

[57] ABSTRACT

A nuclear reactor includes a core melt collection chamber having walls with multilevel protective layers. The layers include one layer part made of refractory concrete and another layer part made of ceramic bricks. The protective layers are anchored to the structural concrete of the collection chamber. In order to provide structural simplification, the layer part made of refractory concrete is constructed in the form of prefabricated blocks which are jointed together and are fastened to the structural concrete, and the layer part made of ceramic bricks is braced to the blocks of the layer part made of refractory concrete.

10 Claims, 8 Drawing Sheets

NUCLEAR REACTOR WITH A COLLECTION CHAMBER FOR CORE MELT

CROSS-REFERENCE TO RELATED APPLICATION

This application is a continuation of International application Ser. No. PCT/DE96/01059, filed June 14, 1996.

BACKGROUND OF THE INVENTION

FIELD OF THE INVENTION

The invention relates to a nuclear reactor including a core melt collection chamber having walls with multilevel protective layers, including one layer part made of refractory concrete and another layer part made of ceramic bricks, the protective layers being anchored to the structural concrete of the collection chamber.

German Published, Non-Prosecuted Patent Application DE 43 39 904 A1, corresponding to U.S. application Ser. No. 08/651,307, filed May 22, 1996, discloses a nuclear reactor of the above-mentioned type, in which the layer parts are fastened to the structural concrete with common tensile anchors, with one such tensile anchor being provided for each ceramic brick. That structure gives rise to a comparatively high degree of outlay for construction, because the tensile anchors must be positioned as accurately as possible with regard to expansion joints.

In the known reactor, additional anchoring points may be provided in the layer part made of refractory concrete. They are encapsulated by refractory concrete.

SUMMARY OF THE INVENTION

It is accordingly an object of the invention to provide a nuclear reactor with a collection chamber for core melt, which overcomes the hereinafore-mentioned disadvantages of the heretofore-known devices of this general type, which in contrast thereto achieves a structural simplification, in particular a reduction in the number of fastening points and which at the same time ensures that the core melt cannot lead to loosening of an anchoring of structural concrete.

With the foregoing and other objects in view there is provided, in accordance with the invention, a nuclear reactor, comprising a core melt collection chamber having at least one wall with structural concrete and a multilevel protective layer; the protective layer having one layer part made of refractory concrete and another layer part made of ceramic bricks, the layer parts anchored to the structural concrete; the layer part made of refractory concrete constructed as prefabricated blocks jointed together and fastened to the structural concrete; and the layer part made of ceramic bricks braced to the blocks of the layer part made of refractory concrete.

The jointing, in particular a tongue and groove engagement, of the prefabricated blocks permits a considerable reduction in the number of fastening points, without detrimentally affecting the structural stability. It is furthermore possible for the ceramic bricks to be braced to the blocks, so as to make it possible to distribute the anchoring of the layer parts, which is advantageous from the technical safety point of view.

In accordance with another feature of the invention, the ceramic bricks are jointed together, for example in a tongue and groove manner or with alternately oriented T profiles, and are only braced at individual points. This makes it possible to reduce the number of fastening points to an even greater extent.

The blocks of the refractory layer can be fastened with a known device. In accordance with a further feature of the invention, the blocks of refractory concrete are held with tensioning elements which are concreted into the structural concrete and engage through holes in the blocks.

In accordance with an added feature of the invention, the blocks are braced with ceramic anchors. In accordance with an additional feature of the invention, the ceramic anchors advantageously contain screw-threaded sleeves which facilitate assembly and improve the introduction of the retention forces.

In accordance with yet another feature of the invention, the ceramic bricks are fastened with T-anchors which are seated in C-rails. An extensive distribution of the retention forces is thereby again achieved with a favorable assembly.

In accordance with a concomitant feature of the invention, in order to prevent the penetration of core melt, as well as to protect the anchoring elements, the joints between the ceramic bricks are filled with zircon felt. The joints thereby serve for the thermal expansion of the zircon bricks.

Other features which are considered as characteristic for the invention are set forth in the appended claims.

Although the invention is illustrated and described herein as embodied in a nuclear reactor with a collection chamber for core melt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
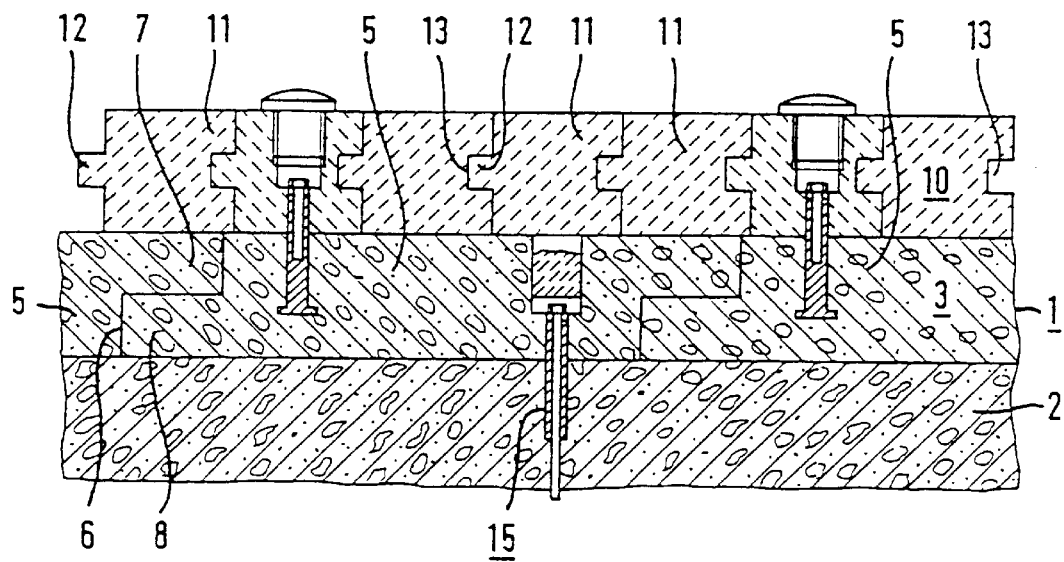
FIG. 1 is a fragmentary, diagrammatic, sectional view of a portion of a wall (the bottom) which is configured according to the invention and is part of a collection space for core melt.
Figure 11:
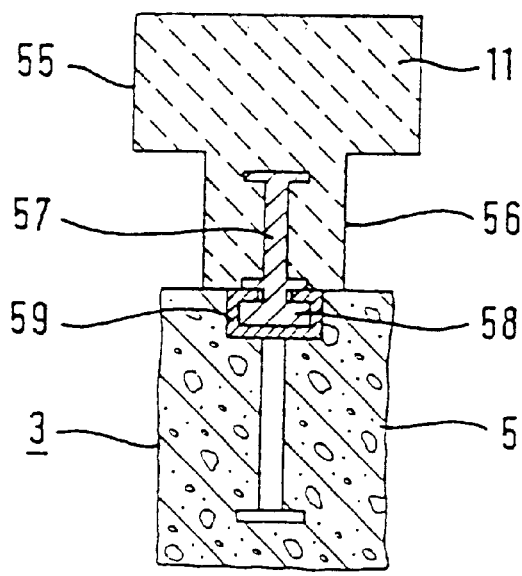
FIG. 11 is a fragmentary, sectional view showing a fastening of a ceramic brick with a rail.

Referring now to the figures of the drawings in detail and first, particularly, to FIG. 1 thereof, there is seen a wall, in particular a bottom part, of a core melt collection space which is disposed in a reactor building, for example as in FIG. 11 of German Published, Non-Prosecuted Patent Application DE 43 39 904 A1, corresponding to U.S. application Ser. No. 08/651,307, filed May 22, 1996. Structural concrete 2 defining a wall 1 supports a layer part 3 made of refractory concrete, which is laid out in the form of prefabricated blocks 5. The blocks 5 are jointed together by engaging above one another along joints 6 with projections 7 and 8 which are offset in height.

A layer part 10 which is seated on the layer part 3, is formed of ceramic bricks, in particular $ZrO_2$ bricks 11. The ceramic bricks 11 are likewise jointed together by engaging with a tongue 12 in a groove 13 of the neighboring brick 11 in each case.

Figure 2:
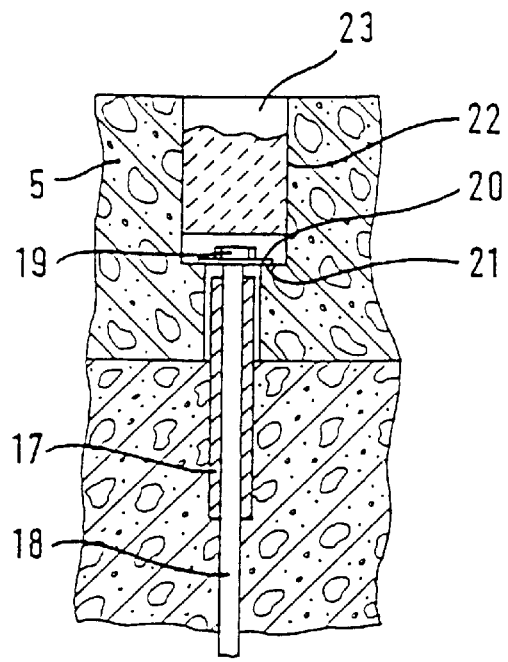
FIG. 2 is an enlarged, fragmentary, sectional view showing an anchoring of blocks of a layer part made of refractory concrete.

An anchoring 15 of the blocks 5 to the structural concrete 2 is seen in FIG. 2 to include a threaded bushing 17 which is screwed onto a steel reinforcement 18 embedded in the structural concrete 2. A screw 19 engages from the top in the screw-threaded bushing 17 and presses a washer 20 against a surface 21 of the block 5 at the bottom of a hole 22 in the block. The hole 22 is closed off at the top by a zirconium dioxide screw plug 23.

As a result of the jointing, that is to say the mutual engagement of the tongue and groove, the ceramic bricks 11 of the layer part 10 only need to be fastened to the layer part 3 at a few points. To this end, steel anchors 25 are embedded in particular individual blocks 5. The steel anchors have a screw-threaded bore 26 into which screws 27 can be screwed. The anchors 25, which may also be made of ceramic in this case, press a washer 28 against a surface of the ceramic brick 11 at the bottom of a hole 29 in the ceramic brick. The hole 29 is subsequently closed off in a leak-tight manner with a screw-threaded plug 30 made of zirconium dioxide.

Figure 3:
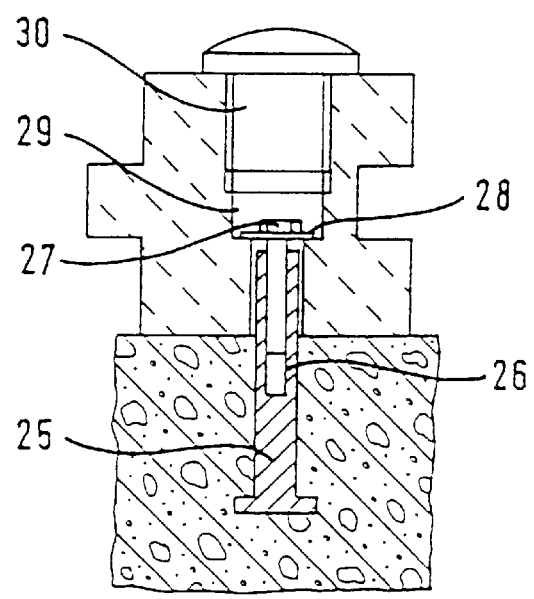
FIG. 3 is an enlarged, fragmentary, sectional view showing a fastening of ceramic bricks.
Figure 4:
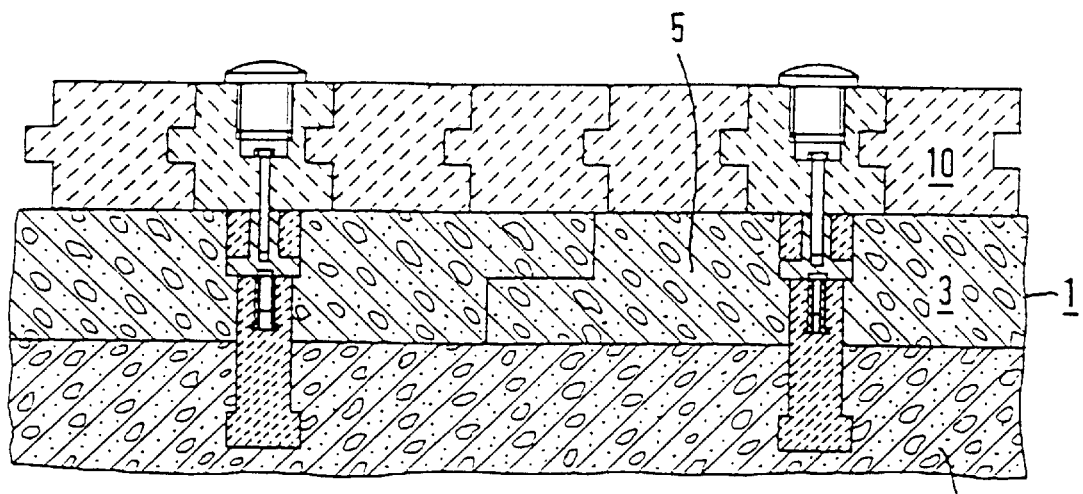
FIG. 4 is a view similar to FIG. 1 of another embodiment of the wall configuration.
Figure 5:
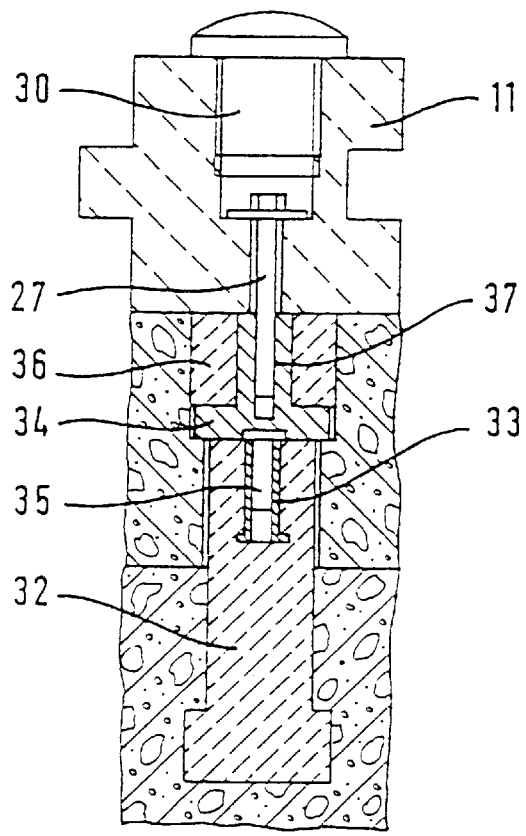
FIG. 5 is an enlarged, fragmentary, sectional view showing a fastening of the ceramic bricks according to FIG. 4.

In the embodiment according to FIGS. 4 and 5, the layer parts 3 and 10 are fastened to the structural concrete 2 with ceramic anchors 32, but in all other respects are composed of blocks 5 and jointed bricks 11 in the same way as in the embodiment of FIG. 1. The ceramic anchors 32 contain a screw-threaded sleeve 33 into which a screw-threaded stem 35 of a steel screw-reception piece 34 is screwed. The screw-reception piece 34 has a rectangular profile in cross-section and carries a ceramic sleeve 36 for reducing thermal loading. Particular individual bricks 11 are then once again fastened with screws 27 in a screw-threaded bore 37 which leads to the upper side. As in FIG. 3, these screws 27 engage in a hole 29 and are covered with a screw plug 30.

Figure 6:
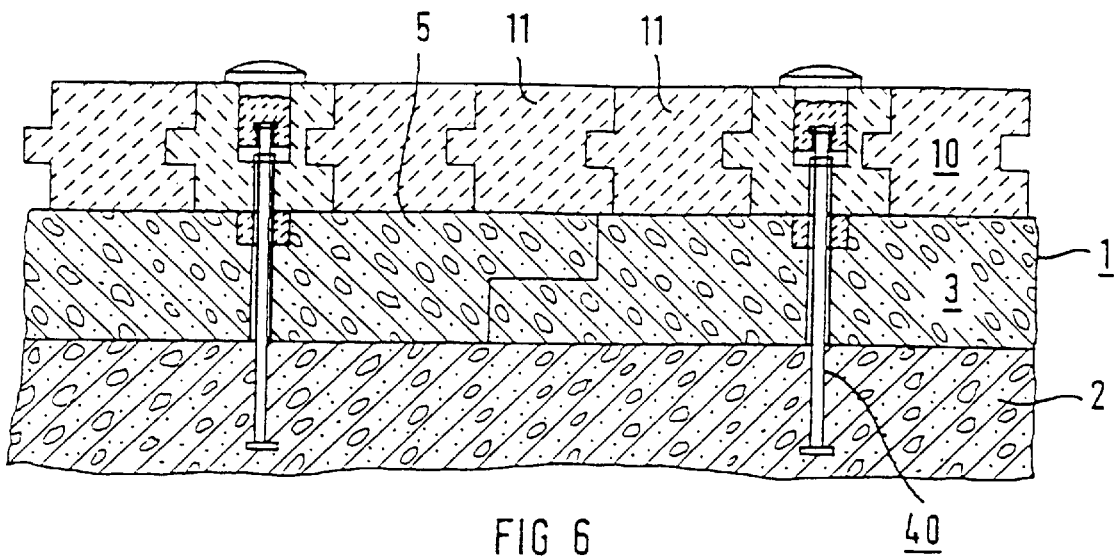
FIG. 6 is a view similar to FIG. 1 of a further embodiment of the wall configuration.
Figure 7:
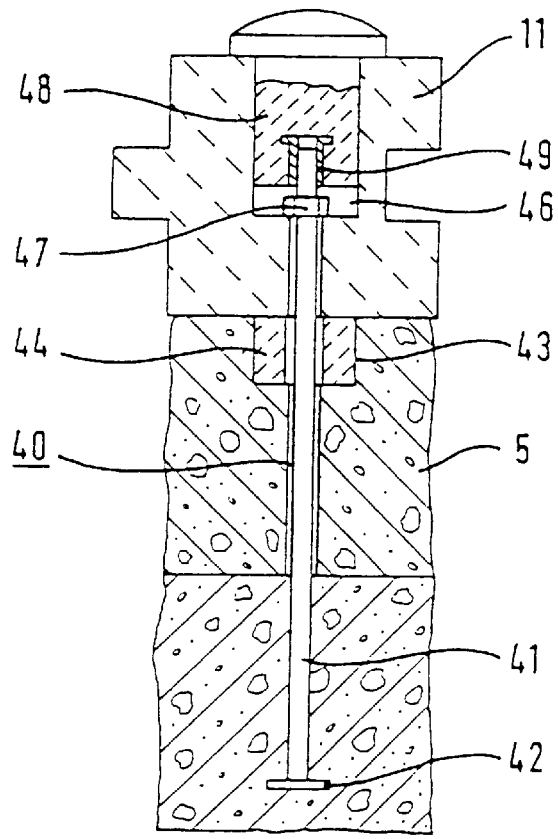
FIG. 7 is an enlarged, fragmentary, sectional view showing a fastening of the ceramic bricks according to FIG. 6.

FIG. 6 shows an embodiment of a common fastening 40 of particular individual bricks 11 of the layer part 10 and of blocks 5 of the layer part 3, which is represented on an enlarged scale in FIG. 7. The common fastening 40 includes a metal anchoring screw 41 which has a baseplate 42 and extends through a block 5 and a brick 11 lying on top.

An upper side of the block 5 has a diametrically enlarged hole 43 in which a ceramic sleeve 44, optionally with an inner metal lining, is seated as a nut and presses on the block 5 at the bottom of the hole 43. If the ceramic sleeve 44 is to be used only for thermal insulation and will not be mechanically stressed, then it is possible to use a separate nut which will be covered only by the ceramic sleeve 44 after tightening. The anchoring screw 41 furthermore extends through the brick 11 into a hole 46. There the anchoring screw 41 carries a nut 47 which presses on the brick 11 at the bottom of the hole 46. After the nut 47 is tightened, the hole 46 can be closed off with a zirconium dioxide plug 48 which is screwed, by a screw-threaded bush 49, onto that end of the anchoring screw 41 which protrudes above the nut 47.

Figure 8:
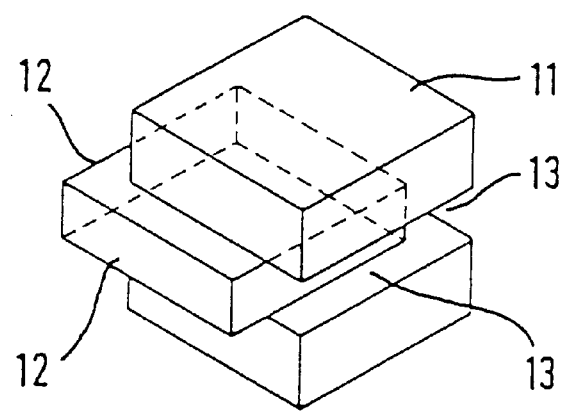
FIG. 8 is a perspective view of a ceramic brick.
Figure 9:
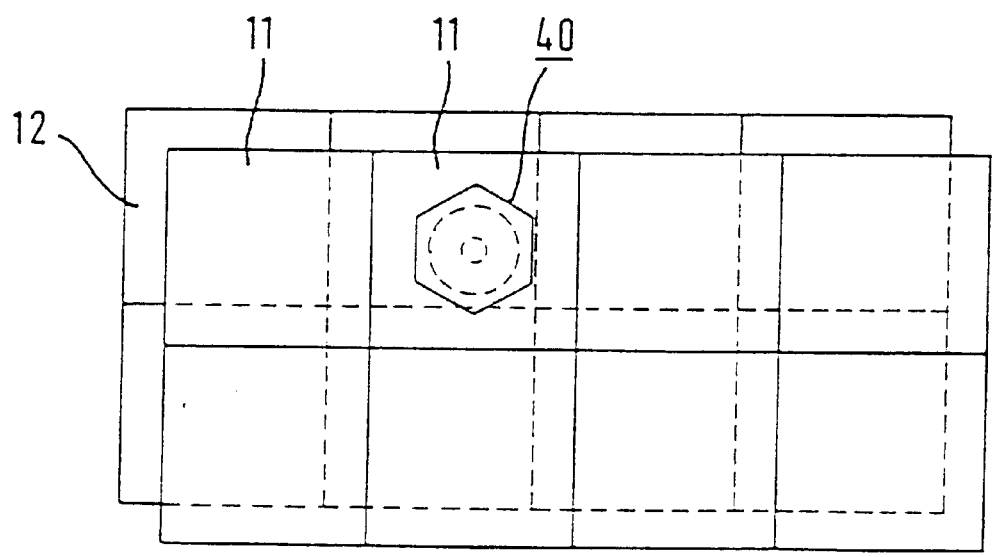
FIG. 9 is an elevational view showing a layer composed of ceramic bricks according to FIG. 8, with a position of a fastening point.

FIG. 8 shows that the tongue 12 of the brick 11 protrudes in two mutually perpendicular directions from a shape which is cubic in principle. Accordingly, the groove 13 is also drawn in two mutually perpendicular directions. The jointing which results therefrom is represented in FIG. 9. The jointing achieves the effect that one fastening point 40 suffices for more than one brick 11, in particular nine or more bricks 11. Direct fastening of each individual brick is likewise possible.

Figure 10:
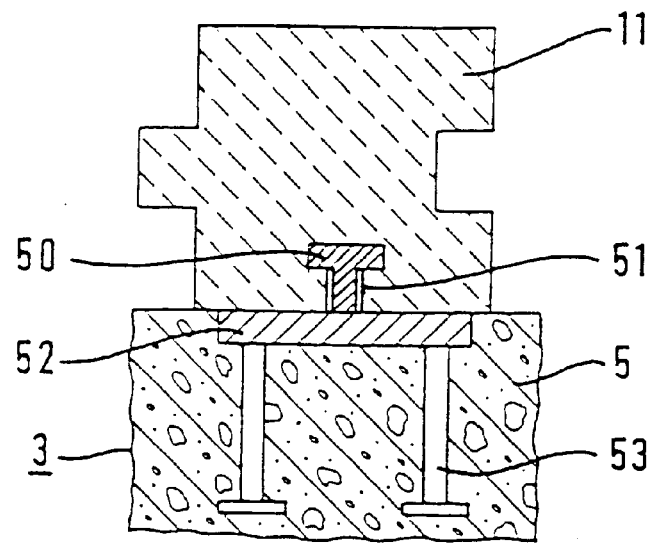
FIG. 10 is a fragmentary, sectional view showing a fastening of a ceramic brick with an anchoring plate.

FIG. 10 shows that, despite the jointing, the bricks 11 can also be fastened with a steel rail 50 which has a T-shaped cross-section. The bricks 11 are fitted onto the steel rail 50 through the use of a groove 51, which likewise has a T-shaped cross-section. The steel rail 50 is fastened to an anchoring plate 52 which is embedded in the upper side of particular individual blocks 5 and is fastened with anchoring rods 53. The anchoring plate 52 extends in the direction perpendicular to the plane of the drawing. Like the fastening 40 represented in FIG. 9, the anchoring plate 52 is only disposed on a few bricks 11, so that nine or more bricks are fastened through the use of one anchoring plate 52.

In the embodiment according to FIG. 11, the bricks 11 have a profile with a T-shaped cross-section. The T-shaped cross-section has a projection 55 with a height being equal to that of an undercut 56, so that the bricks 11 can be stacked in each other by alternate rotation. Each brick 11 has a base adjoining the lower part 3. The bases of the bricks 11 of every other row contain an anchor 57 with a widened T-shaped head piece 58 which protrudes from the brick. The head pieces 58 of the anchors 57 are inserted into a rail 59 with a C-shaped profile in the underlying block 5. In this way, the bricks 11 with the anchors 57 are fixed and at the same time they hold down a neighboring row of bricks 11, which do not have anchors 57, through the use of their projection 55. As has been explained with reference to FIG. 8, the projections 55 and the undercuts 56 may also extend in two mutually perpendicular directions.

Figure 12:
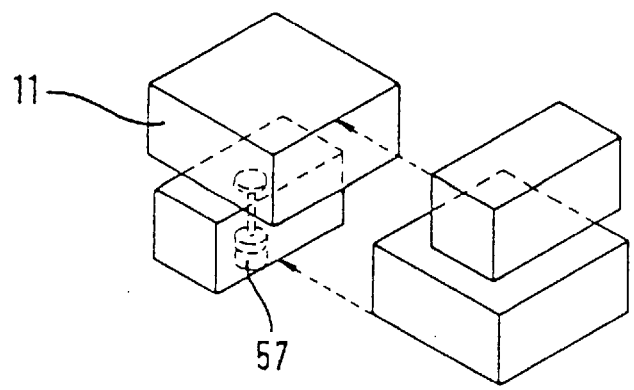
FIG. 12 is a perspective view of a configuration of zircon blocks with an alternating T profile.
Figure 13:
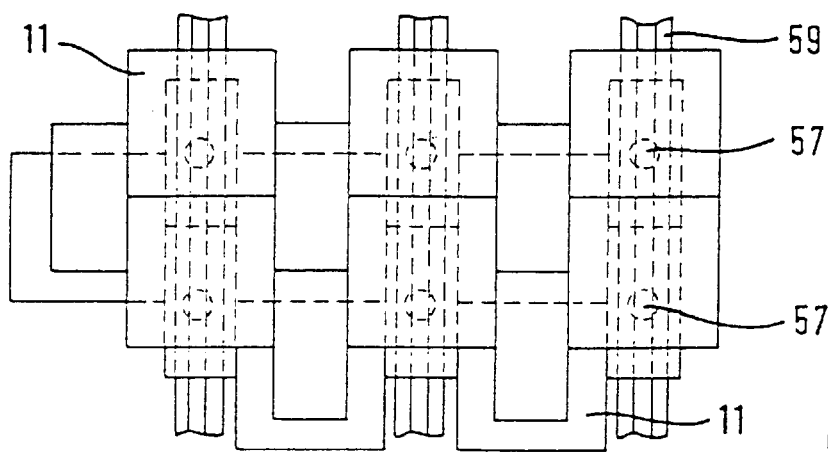
FIG. 13 is a fragmentary, plan view showing a configuration of zirconium oxide bricks with a T profile.

This undercutting of the projections 55 in the case of T-shaped bricks 11 which alternate (that is to say they are respectively rotated through 180°) is shown in FIG. 12 in a similar manner to FIG. 8. The pattern of the bricks 11 which results from this configuration is represented in FIG. 13. Thus, as is seen in a direction perpendicular to the rail 59, every other brick 11 is anchored with a corresponding rail 59.

Figure 14:
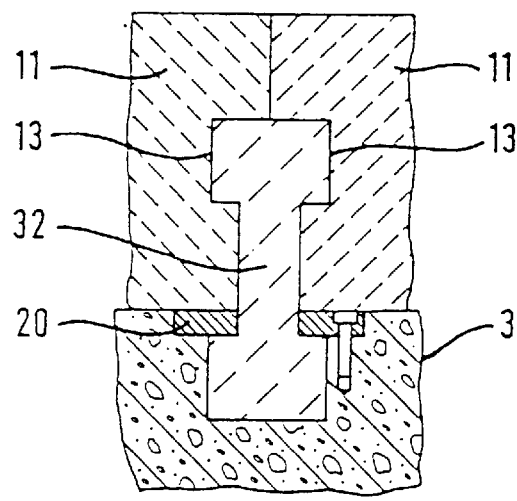
FIG. 14 is a fragmentary, sectional view showing a fastening of the ceramic bricks according to a tongue and groove principle.

FIG. 14 is an enlarged, longitudinal-sectional view showing one way of anchoring neighboring bricks 11, in which a ceramic anchor 32 is embedded in the layer part 3 made of refractory concrete. This anchor may also be twisted in or screwed. The ceramic anchor 32 engages at a meeting point of four adjoining bricks 11, as a tongue in a respectively corresponding groove in the bricks 11. In this case the bricks 11 are constructed as represented in FIG. 8, with a corresponding modification only being made at the point where the anchor 32 engages. To this end, each brick 11 has a hole at a corner point in which one quarter of the anchor 32 is received. Four bricks 11 thus enclose one anchor 32 and are thereby fixed. The anchor 32 has a double-T profile and is fastened in the layer part 3 by a split steel washer 20 which is screwed to the layer part 3. The anchor 32 may also be directly embedded in the layer part 3. It is likewise possible to construct the anchor 32 as a rail similar to the rail 59 represented in FIG. 11 and in FIG. 13.

Figure 15:
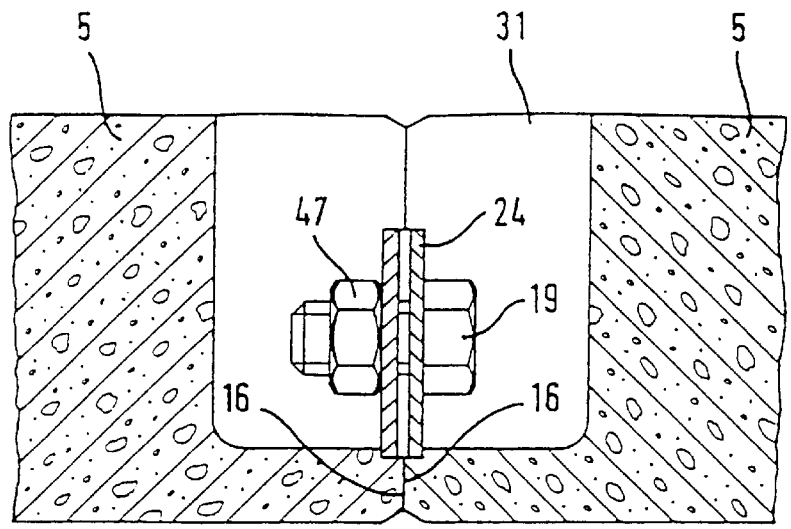
FIG. 15 is a fragmentary, longitudinal-sectional view showing a fastening of two blocks of the layer part made of refractory concrete.
Figure 16:
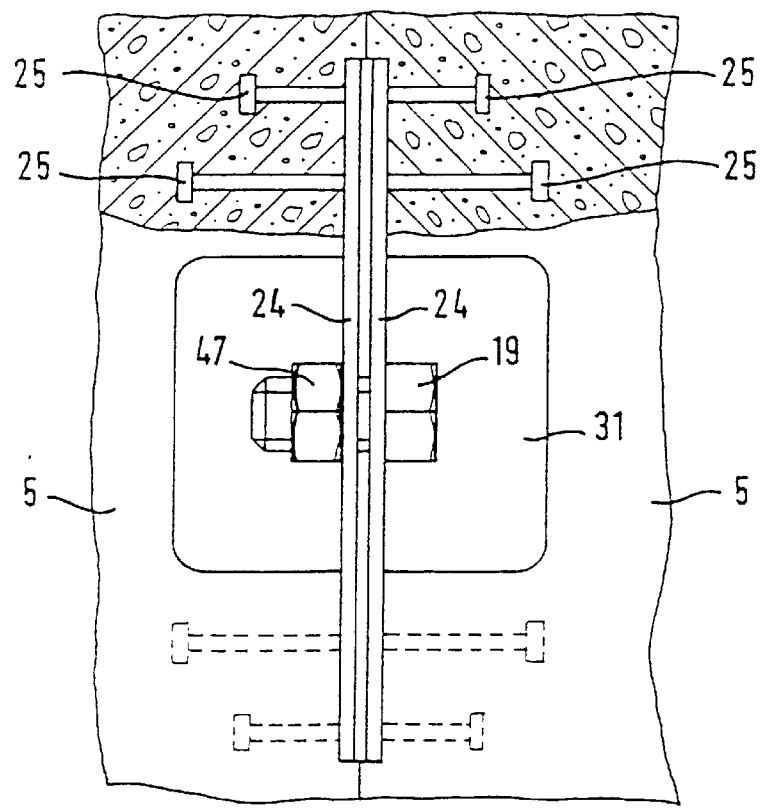
FIG. 16 is a fragmentary, plan view showing the fastening according to FIG. 15.

FIG. 15 and FIG. 16 respectively show a longitudinal section and a plan view of a connection of blocks 5 of the layer part 3 made of refractory concrete. A metal plate 24 which is disposed on an end surface 16 of a block 5, extends along the end surface 16 and is securely fastened to the block 5 by four steel anchors 25. A hole 31 which is provided in a region between the steel anchors 25 is open towards the top, that is to say towards the layer part 10, and a screw 19 is fed through the plate 24 in the hole 31. Two neighboring blocks 5 respectively abut at their plates 24, so that the screw 19 is fed through both plates 24 and is firmly tightened with a nut 47. In this way, the two plates 24, and therefore the two blocks 5, are securely connected to each other. A pocket which is formed in the refractory concrete by virtue of the corresponding holes 31 in the two blocks 5 can be closed off with a non-illustrated ceramic plug. The use of such a connection between blocks 5 of the layer part 3 also permits only particular individual blocks to be connected to the structural concrete 2 lying underneath the blocks 5.

The invention is distinguished by a multilevel protective layer which is disposed, in particular, on the bottom part of the collection chamber. A first layer part, made of refractory concrete, is constructed in the form of prefabricated blocks and extends over the structural concrete of the collection chamber. Fastening of the blocks to one another and/or interlocking of the blocks by virtue of mutually engaging projections leads to fastening of the blocks to the structural concrete at a few individual points, so that only a few blocks are securely connected directly to the structural concrete, for example by corresponding anchors. A layer part which is formed by virtue of mutual engagement of likewise prefabricated ceramic bricks lies on top of the layer part made of refractory concrete, and is likewise securely connected to the latter only at particular individual ceramic bricks. This produces decoupling of the fastening of the individual layer parts, which effectively prevents the danger of core melts penetrating along the fastening points in the structural concrete. A simple assembly of the protective layers is furthermore achieved. The embodiments which have been described, or other embodiments, can be combined with each other.

We claim:

1. A nuclear reactor, comprising:

a core melt collection chamber having at least one wall with structural concrete and a multilevel protective layer;

said protective layer having one layer made of refractory concrete and another layer made of ceramic bricks, said protective layer anchored to said structural concrete;

said layer made of refractory concrete constructed as prefabricated blocks jointed together and fastened to said structural concrete; and said layer made of ceramic bricks braced to said blocks of said layer made of refractory concrete.

2. The nuclear reactor according to claim 1, wherein said at least one wall is a bottom.

3. The nuclear reactor according to claim 1, wherein said ceramic bricks are jointed together and braced only at individual locations.

4. The nuclear reactor according to claim 1, including tensioning elements concreted into said structural concrete and engaging through holes in said blocks made of refractory concrete for holding said blocks.

5. The nuclear reactor according to claim 1, including ceramic anchors bracing said ceramic bricks.

6. The nuclear reactor according to claim 5, wherein said ceramic anchors contain threaded sleeves.

7. The nuclear reactor according to claim 1, including C-rails, and T-anchors seated in said C-rails for fastening said ceramic bricks.

8. The nuclear reactor according to claim 1, wherein said ceramic bricks have joints therebetween, and zircon felt fills said joints.

9. A nuclear reactor comprising:

a core melt collection chamber including a concrete structure having at least one wall, and a multilevel protective layer;

said multilevel protective layer having:

a plurality of prefabricated blocks of refractory concrete joined together to form a first layer, said first layer fastened to said concrete structure; and a plurality of ceramic bricks forming a second layer, some of said plurality of ceramic bricks fastened to said first layer, others of said plurality of ceramic bricks not fastened to said first layer.

10. The nuclear reactor according to claim 9, wherein said second layer includes joints securing adjacent said ceramic bricks together.

* * * * *